June 15, 1926.

W. STANLEY

FISH LURE

Filed Nov. 8, 1924

Inventor:
William Stanley,
by Banning Banning
Attys

Patented June 15, 1926.

1,589,258

UNITED STATES PATENT OFFICE.

WILLIAM STANLEY, OF CHICAGO, ILLINOIS.

FISH LURE.

Application filed November 8, 1924. Serial No. 748,524.

The fish lure of the present invention is primarily intended for use in association with a pork rind strip or the like.

The objects of the invention are—to so construct the metallic body of the lure that it will afford sufficient weight to easily carry out the line when casting; to give to the bait a distinctive formation which will cause a rapid and pronounced wiggling or darting movement as the line is retrieved or the bait drawn through the water, which movements will be imparted to the trailing flexible strip; to afford adequate provsion for the attachment of the hook and line; and to so form and configure the bait as a whole that it will closely simulate a live bait by its lifelike proportions and the glitter and sparkle occasioned by its rapid and darting movements in the water.

Other objects and characteristics of the invention will appear from a detailed description as contained in the specification, and by reference to the drawings, wherein—

Figure 1:
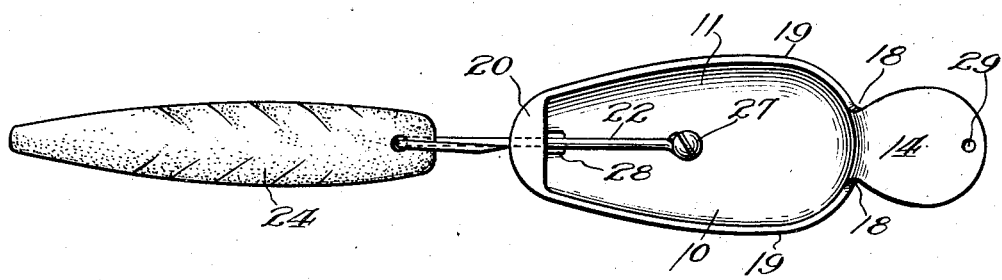
Figure 1 is a top view of the lure with a pork rind strip attached thereto.

The lure comprises a body 10 preferably of metal, to afford the necessary weight, which body is of generally spoon-shaped configuration, being dished out at its upper surface 11 to afford a comparatively shallow concavity, and more abruptly rounded on its lower surface 12 to afford a progressively thickening body which reaches its maximum bulk at substantially the center point 13. This configuration provides a body whose center of mass is at or near its longitudinal center and at a point below its vertical center, so that there will be a tendency to ballast the lure and maintain it with the concave side up.

The front end of the body merges into a flattened head 14, which may either be formed integrally with the body or secured thereto as the case may be, which head, as shown, is slightly dished or concaved on its under face 15, and given a corresponding convexity on its upper face 16.

The under concaved surface 15 of the head rounds downwardly and merges into the convex surface of the body at the point 17, which may be termed the neck, and the edges of the head at or near the same point are rounded inwardly and merge into the edges of the body to afford V-shaped notches 18—18 at the points of mergence.

The edges 19—19 of the body are thin and comparatively sharp, throughout all portions of the body, with the exception of the extreme rear and end thereof, at which point the edges are thickened to afford a bridge 20 which is provided with a longitudinally extending bore 21, through which is entered a shank 22 of the hook 23 upon which the pork rind strip 24 or other flexible strip is impaled.

The forward end of the hook shank terminates in the usual eye 25, which encircles the upper end of a screw stud 26 having a head 27, which stud is screwed into the body of the lure near the center thereof to hold the hook shank rigidly in position with its hook extending upwardly.

In order to afford an easy and convenient means of removing the hook for the purpose of replacement, the body of the lure immediately forward of the bridge is provided with a slightly elongated slot 28 which merges into the bore, so that by removing the screw stud and drawing back the eye of the hook toward the rear end of the body, the eye may be drawn down through the slot 28. The attachment of the line is made through a hole 29 in the forward end of the head 14.

The provision of the elongated slot which enables the hook to be removed by drawing back the forward end and eye through the slot allows the rear or bent end of the hook to be decorated with feathers, buck tail or other like decorations or embellishments commonly employed in the designing of fish lures which greatly facilitates the substitution of such hooks and correspondingly increases the serviceability of the lure. Such substitutions can be readily made in the manner indicated, since the forward end of the shank will be free from obstructions which would otherwise interfere with its ready insertion through the slot.

If desired, the lure may be equipped with a trailing spoon 30 which is of concavo-convex or dished formation, and is secured at its forward end to an eye 31 near the rear under side of the body, so that it will trail behind the hook when it is drawn through the water and swing from side to side to increase the liveliness and glitter of the lure.

Figure 4:
Fig. 4 is a sectional view of a modification showing the bait in very small form for use with fly casting tackle.

Fig. 4 shows a lure of substantially the same character but of very minute size which is adapted for use in trout fishing with fly tackle. In this case the body and head are stamped from a sheet or plate of metal of uniform thickness throughout and the forward end of the hook shank is secured by a drop or layer of solder 32, since the metal is not of sufficient thickness to permit of the use of a screw stud like that previously described. In other respects the configuration of the hook is substantially the same as that previously described.

Figure 2:
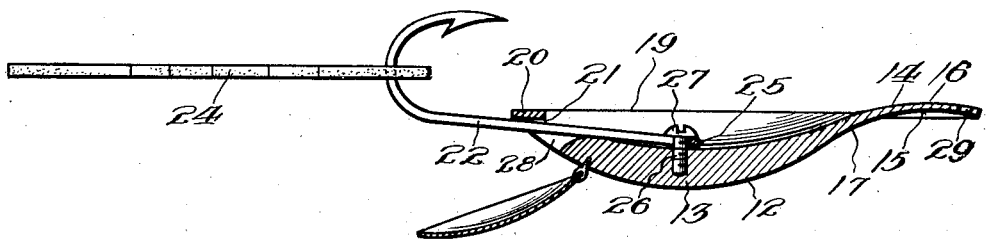
Fig. 2 is a longitudinal sectional view of the same, omitting the pork rind strip.
Figure 3:
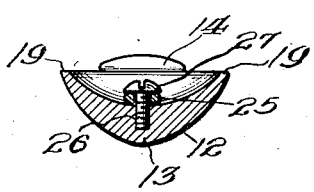
Fig. 3 is a cross sectional view through the center, looking toward the front of the lure;

In the use of the larger lures shown in Figs. 1, 2 and 3, the weight of the body will serve to rapidly carry out the line to the desired extent in casting, and when the hook strikes the water it will, of course, tend to settle toward the bottom. If it strikes the bottom, the disposition of the weight will cause the body to rest upon its convex base with the hook pointing upwardly. As soon as the line is retrieved, and the lure drawn through the water, it will begin to dart from side to side, and at the same time cant or tilt on its longitudinal axis, first in one direction and then in the other. These darting and tilting movements will be imparted to the flexible strip trailing behind the hook, which will thus be caused to wiggle and flutter in an extremely lifelike and attractive manner. At the same time the sharp and quick variations in the direction of movement of the body which will preferably be formed of highly polished metal will cause a fluttering and scintillating effect, which tends to attract the fish, especially when the spoon 30 is employed.

The movements above described appear to be caused mainly by the pressure of the water against the forward end of the lure, and particularly by the configuration of the head at its point of mergence with the body. The thin platelike formation of the head and its flatwise disposition in respect to the body tends in the first instance to maintain the lure on a level reel, but in a state of unstable equilibrium. The water impinging upon the under side of the head, which is preferably concaved as shown, must find an escape, which is afforded through the V-shaped notches 18, between the edges of the neck and body, but the currents of water thus escaping will tend to run off in greater degree, first on one side and then on the other. This will tend to augment the lateral pressure, first in one direction and then the other, which will cause a darting of the lure from side to side, and at the same time the upward and rearward rush of the water in unequal degrees on opposite sides of the lure will tend to cause a back and forth canting or tilting of the body commensurate with the differences in pressure thus exerted.

It appears to be desirable to reduce the width of the head at the point of juncture with the body, to afford a neck of the character indicated, which tends to cause the streams of water to impinge abruptly against the body near its forward end and in advance of its middle section of greatest diameter; and I have observed that when the head is carried backward, without the provision of a narrowing neck, the water streams are directed more nearly along the sides of the body, and the motions imparted to the lure are much less pronounced and satisfactory.

The hollowing out or dishing of the body on its upper surface appears to be desirable in order to thin down the edges or margins of the body and permit the latter easily to slide over from one side to the other, and I have observed that this tendency is more marked where the body is thus hollowed than where its upper surface is plain or flat.

Although the particular form shown is one which has given marked satisfaction, the configuration of the body or head may be modified to a considerable degree without destroying or materially impairing the action of the lure. The lure is one which may be made in a number of different sizes both for fresh water and salt water game fish, being capable of use in sizes ranging from those small enough to be employed with the fly casting tackle up to sizes which are adapted to the largest of the game fish.

I claim:

1. In a fish lure, the combination of an elongated semi-ovate body having a concave upper surface, a hook resting within the concavity in the upper surface and having the forward end on its shank secured to the body and having its barbed end extending rearwardly from the body, a flattened head extending forwardly from the body and terminating at its point of mergence with the body in a neck of reduced width, affording, in conjunction with the side margins of the body, a pair of side notches for the back flow of water, substantially as described.

2. In a fish lure, the combination of an elongated semi-ovate body having a concave upper surface, a hook resting within the concavity in the upper surface and having the forward end on its shank secured to the body and having its barbed end extending rearwardly from the body, a flattened head extending forwardly from the body and terminating at its point of mergence with the body in a neck of reduced width, affording, in conjunction with the side margins of the body, a pair of side notches for the back flow of water, said head being dished on its under surface, the curvature of said dished surface merging into the curvature of the forward end of the body, substantially as described.

3. In a fish lure, the combination of a metallic body of semi-ovate formation, having a shallow concavity in its upper surface to bring the preponderance of mass at a point near the longitudinal center of the body, the body being provided at its rear end with a bore, a hook having its shank entered through said bore and having its eye positioned near the center of the concave upper surface and having its barbed portion extending rearwardly and upwardly from the body, an attaching screw entered through the hook eye and into the body, and a flattened head extending forwardly from the body in substantial alignment with the upper rim thereof, said head being reduced in width at its point of mergence with the body to afford side notches for the back flow of water, substantially as described.

4. In a fish lure, the combination of a body of concave formation on its upper surface and a head extending forwardly from the body, the head being of concave formation on its under surface, the head at the point of mergence with the body forming a neck of reduced width, substantially as described.

WILLIAM STANLEY.